Aug. 2, 1932.   W. S. HOWARD   1,869,747
AUTOMOBILE TRUCK DERRICK
Original Filed Dec. 26, 1929.   7 Sheets-Sheet 1

Aug. 2, 1932. W. S. HOWARD 1,869,747
AUTOMOBILE TRUCK DERRICK
Original Filed Dec. 26, 1929 7 Sheets-Sheet 3

Aug. 2, 1932.  W. S. HOWARD  1,869,747
AUTOMOBILE TRUCK DERRICK
Original Filed Dec. 26, 1929  7 Sheets-Sheet 5

Patented Aug. 2, 1932

1,869,747

UNITED STATES PATENT OFFICE

WILLIAM S. HOWARD, OF NEW YORK, N. Y., ASSIGNOR, BY MESNE ASSIGNMENTS, TO UTILITY PRODUCTS COMPANY, A CORPORATION OF NEW JERSEY

AUTOMOBILE TRUCK DERRICK

Application filed December 26, 1929, Serial No. 416,513. Renewed January 21, 1932.

The invention relates to automobile truck cranes or derricks and like hoisting, lowering, loading, unloading and pulling machines and apparatus. The particular object is to provide an apparatus and machine of this character which is specially suited for conveyance and operation on auto-truck road vehicles, having in view the nature and limitations of such vehicles, the maximum and most effective utilization of the carrying capacity and power of the vehicle, and the yielding character of the support. It has been my purpose to devise a construction which is very economical to make, so that it may be sold for a moderate price, and which, when mounted, is advantageously integrated with the vehicle which forms its traveling support and source of power, as well as a carrier for the loads which the derrick handles.

The invention particularly contemplates an apparatus of the foregoing description which can be readily and quickly applied to any platform truck without making changes or alterations in the construction of the truck, and which can as readily be removed from the truck if desired, in order that the truck may be used for ordinary purposes.

In accordance with the invention the operating mechanism for the boom is supported or carried above the pivotal point of the boom and at a considerable distance above the platform of the truck, and the controls are readily accessible to an operator standing alongside of the truck.

One of the features of the invention is the provision of a live boom having great selectivity in its various operations, up and down and laterally. All the functions of the boom are power operated.

A particular feature of the invention is that the automobile crane is so constructed and organized as to occupy a minimum of space on the deck of a truck, preferably immediately behind the cab, leaving practically the entire deck available for cargo.

The invention will be readily understood from the following description of the preferred embodiment illustrated in the drawings, wherein.

Figure 1:
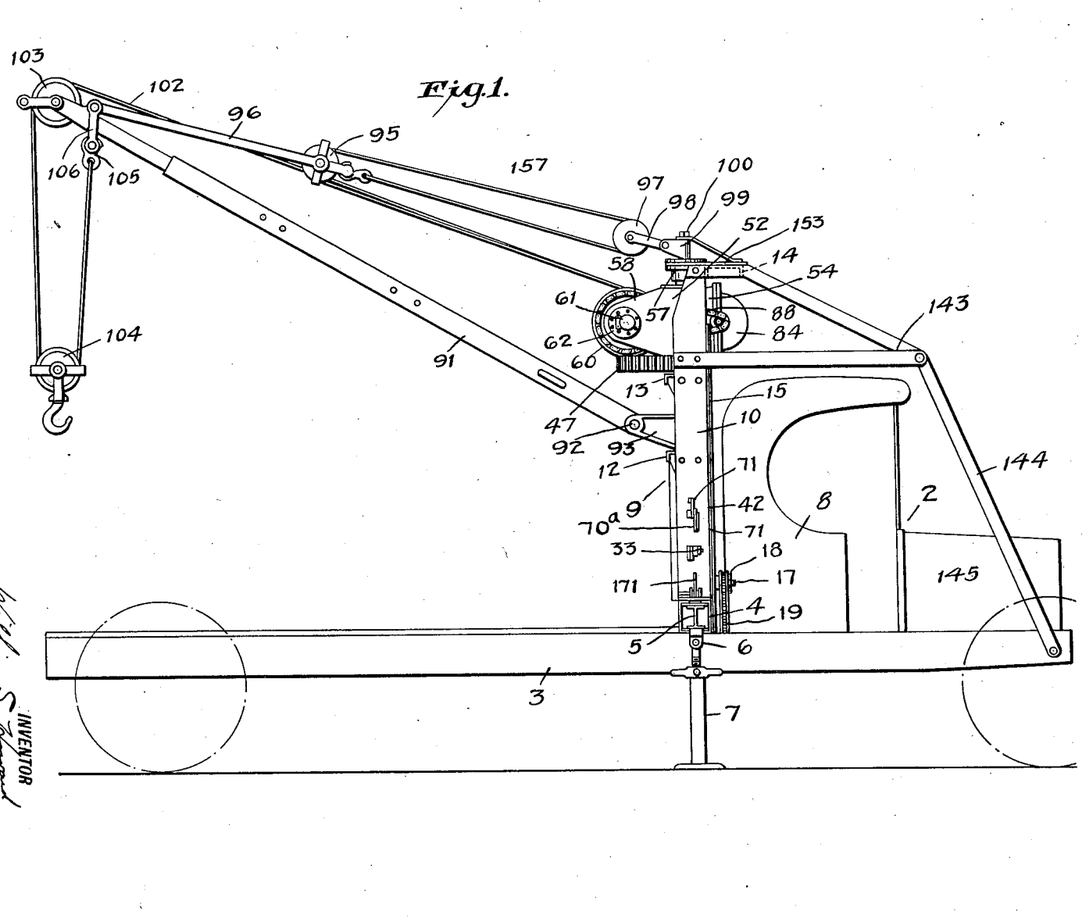
Fig. 1 is a side elevation of the improved automobile truck derrick.
Figure 2:
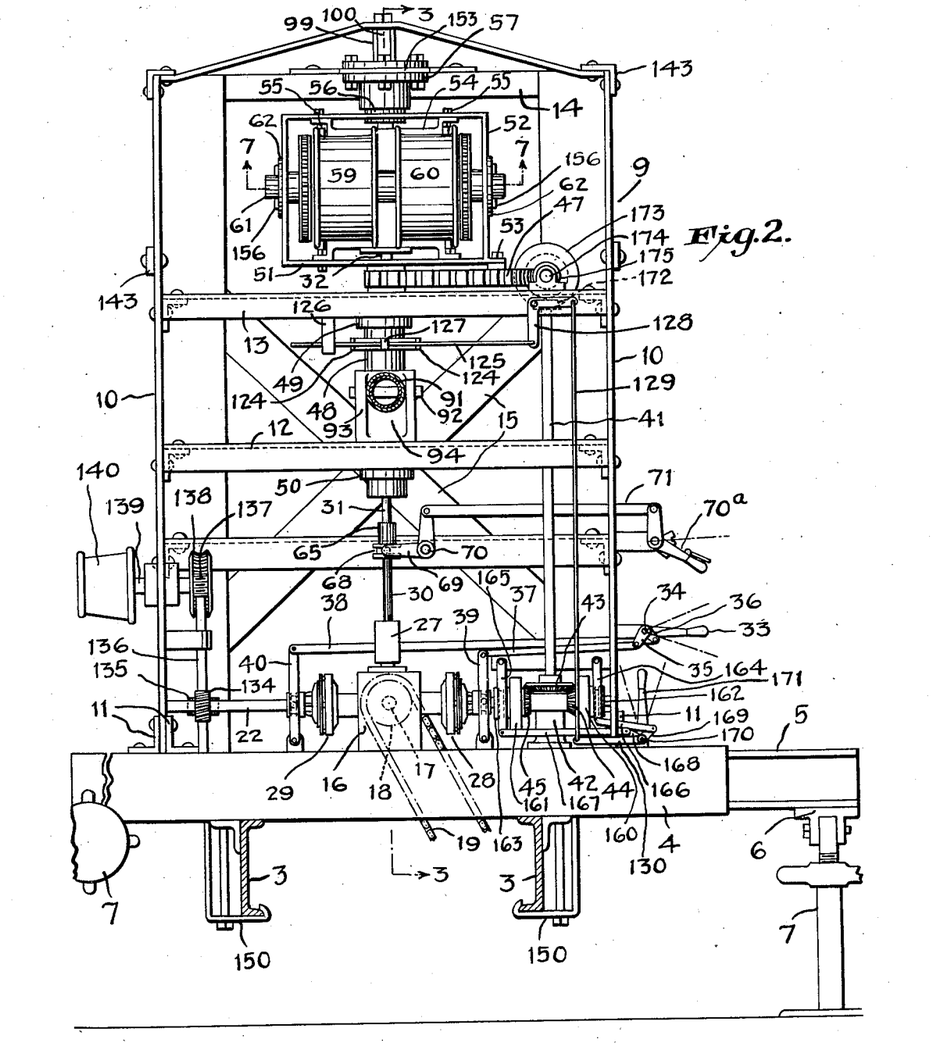
Fig. 2 is a vertical transverse section through the chassis and the boom behind the derrick frame, showing this frame and the derrick mechanism in elevation.
Figure 3:
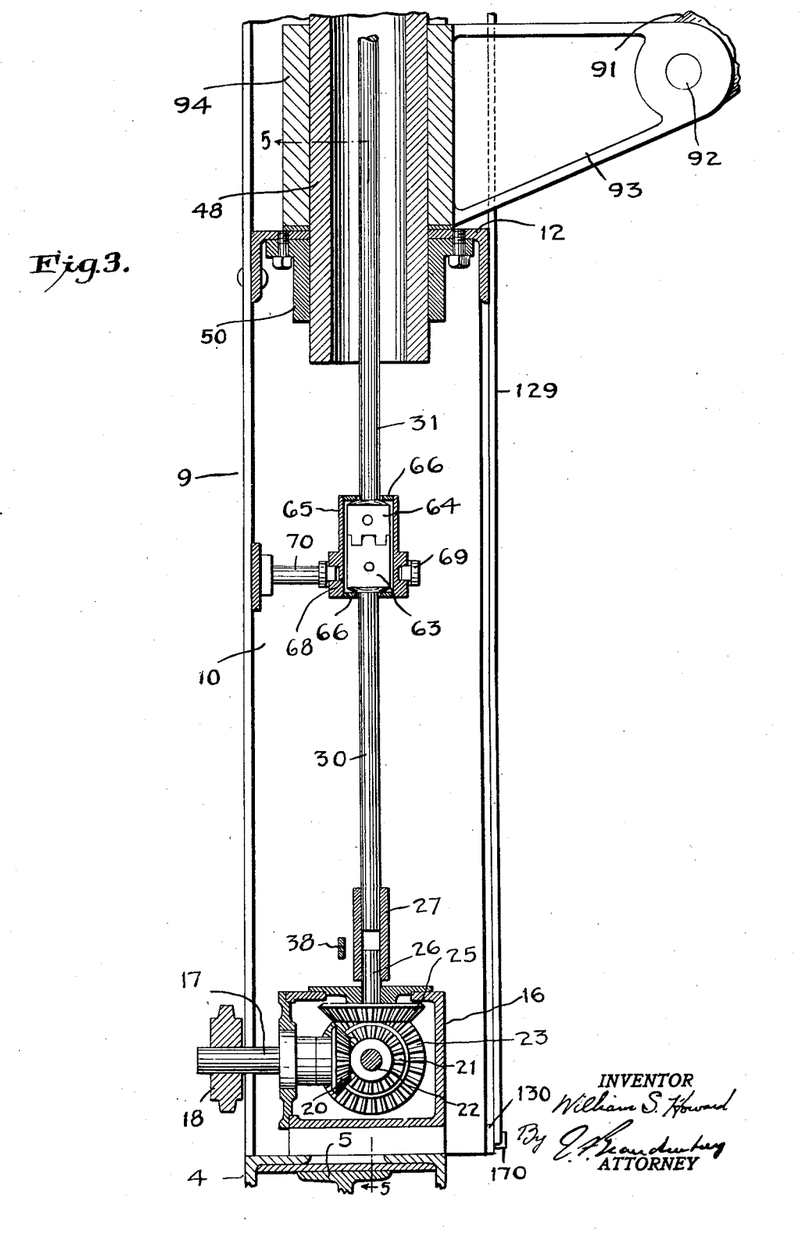
Fig. 3 is a section taken on the line 3—3 of Fig. 2 through approximately the lower half of the derrick.

The automobile truck as a whole is designated 2, and the side sills of its frame are marked 3. A basal cross member 4 is mounted on the longitudinal members 3, to which it is detachably secured by clamps 150, this cross member being advantageously formed of a pair of channels facing each other so as to constitute in effect a boxed beam, the ends of which project beyond the sides of the vehicle frame. The interior of this beam or cross member is utilized to receive two I-beam extension members 5, one of which is seen in Fig. 2. The extension members 5 have free sliding fit in the hollow beam 4, so that they can be either pushed into the hollow beam, as is the case at the left of Fig. 2, or can be partly extended outboard of the vehicle as shown at the right of the view. The outer ends of the extension members 5 have pivot fittings 6 at the bottom, on which are hung jacks 7 for giving lateral wide-base support when the derrick is in operation. When the vehicle is in motion these jacks are swung up out of the way and act in a suitable manner.

The cross member 4 is placed directly behind the cab or driver's place 8, and forms the bottom element of a fixed, upright, oblong frame 9. This frame is broad transversely of the vehicle and very shallow in the fore and aft direction, this shallowness extending from the base upward so that the maximum amount of carrying space is provided on the platform or other suitable body. Upright side members 10 of this frame, of angle or channel section, are erected upon the bottom cross member 4, to which they are secured by rivets and angle pieces 11. The members 10 are strongly connected at different heights by the cross channels 12, 13 and 14 and also by diagonal braces 15, the parts being riveted together to form a very strong but comparatively light and very compact structure. The strong but partially flexible and resilient frame thus constituted is stoutly braced from the forward end of the chassis by buttress cantilever frames 143 extending forward from the upper portions of the uprights 10 over the top of the cab 8 and joined at the front to tension bars 144 which extend downward and forward at opposite sides of the hood 145 for suitable anchorage at the forward ends of the sills 3. The top cross member 14 is connected to the upper side members of the cantilever frames 143, somewhat forwardly of the side uprights 10 of the vertical derrick frame, so as not to interfere with the cables of the derrick when the boom hereinafter referred to is raised to a high position.

A grease-tight casing 16 is mounted within the frame on the center of the basal cross member 4. In this casing is journaled a horizontal fore and aft power-receiving shaft 17, one end of which is adapted to be driven by a sprocket wheel 18 outside the casing. A sprocket chain 19 leading from a customary power take-off on the vehicle passes over this sprocket to drive the derrick mechanism from the engine of the vehicle. It is unnecessary to illustrate the power take-off, as these mechanisms for taking power from the main power plant of the truck when the vehicle is at rest are well known.

On the end of the power-receiving shaft within the casing 16 is secured a bevel pinion 20. The bevel pinion 20 meshes another bevel pinion 21 keyed or otherwise held to a horizontal shaft 22 running at right angles to the shaft 17 and having suitable bearings in the upright side members 10 of the frame. The shaft 22 is thus adapted to be continuously driven when the power take-off is in engagement with the main power plant of the vehicle.

Freely mounted on the shaft 22 and housed within the casing 16 are bevel gears 23 and 24. The bevel gears 23 and 24 are in engagement with a bevel gear 25 mounted on a stubshaft 26 having a suitable bearing in the upper part of the casing 16.

Secured to the stub-shaft 26 is one end of a sleeve 27, the opposite end of which is splined to a vertical driving shaft consisting of sections 30, 31 and 32.

Figure 5:
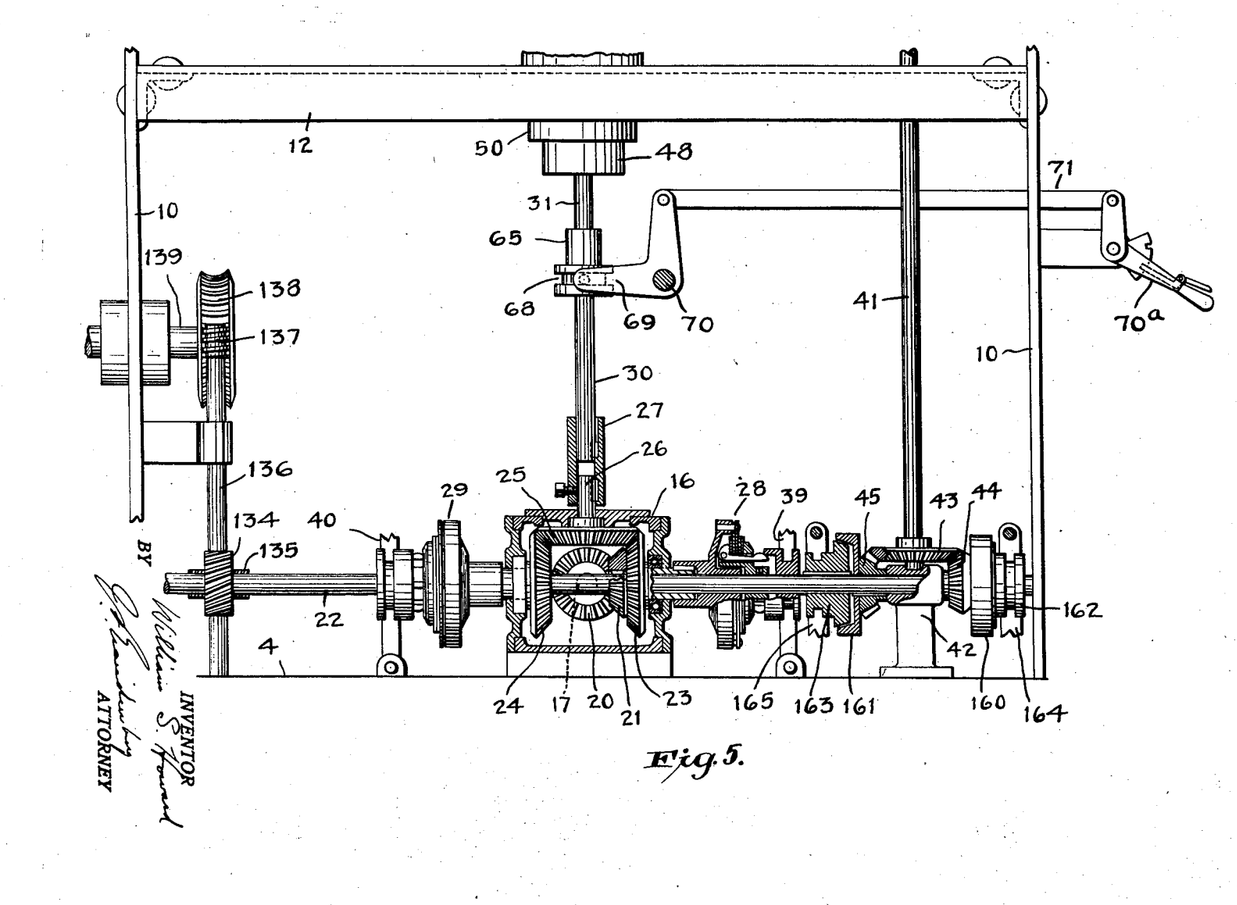
Fig. 5 is a central vertical section with parts in elevation and parts broken away, taken on the line 5—5 of Fig. 3.
Figure 6:
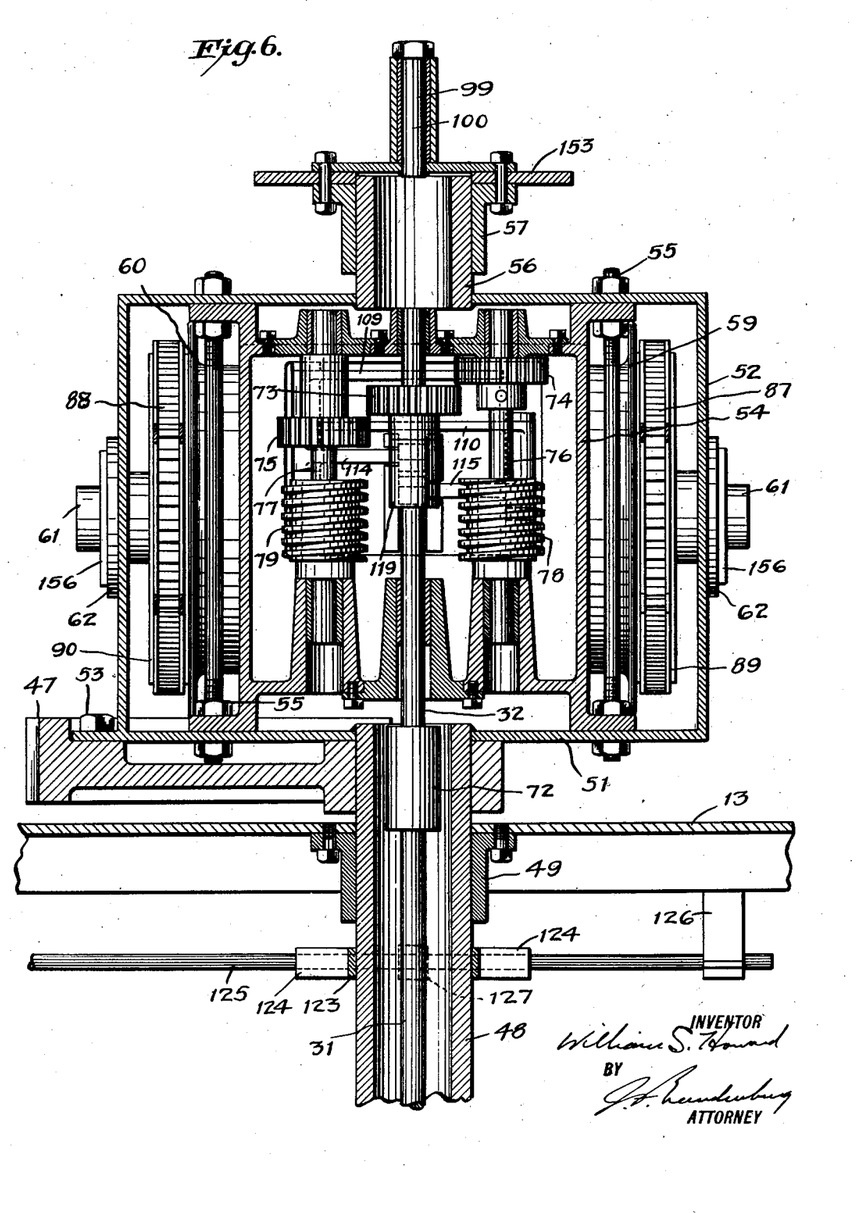
Fig. 6 is a central, vertical section taken on the line 6—6 of Fig. 4.
Figure 7:
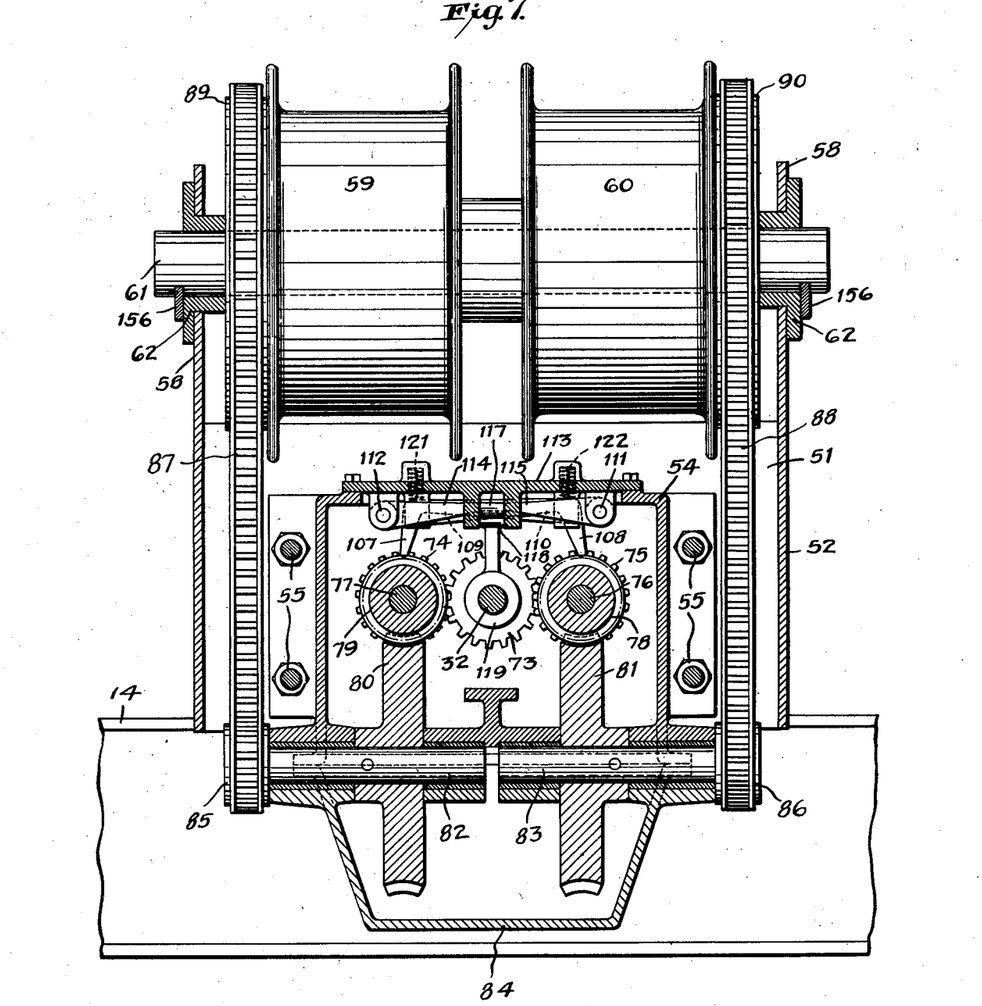
Fig. 7 is a horizontal section taken on the line 7—7 of Fig. 2, with the drums and sprocket drives in plan.

Power-controlling and direction-reversing clutches are provided for driving the shafts 22 and 30 in either one direction or the other. These clutches comprise friction disc clutch couplings 28 and 29 of known or suitable type. As will be noted in Fig. 5, one side of each of the clutches is keyed or otherwise secured to the hubs of the bevel gears 23 and 24. It will thus be apparent when the clutch-couplings 28 and 29 are disengaged or in neutral position the shaft 22 will rotate idly and the vertical shaft 30 will be stationary.

When the clutch 28 is engaged the bevel gear 23 will be clutched to the shaft 22 and power will be transmitted through the bevel pinions 20 and 21 to drive the shaft 22 and shaft 30. At this time the bevel pinion 24 with that part of the clutch coupling secured to its hub will be freely rotating on the shaft 22.

When the clutch coupling 29 is thrown into operative position the shafts 22 and 30 will be driven in the opposite direction and the bevel gear 23 will rotate freely on the shaft 22.

Means are provided for throwing either one of the clutches 28 and 29 into operative engagement. This means is particularly illustrated in Fig. 2 and provision is made whereby it is impossible to engage both clutches at the same time. A hand lever 33 is pivoted at 34 in a bracket mounted on one of the upright side members 10. The hand lever is capable of being placed in three positions and as illustrated it occupies the intermediate or neutral position and both clutches are disengaged.

Secured to the pivot shaft 34 are short levers 35 and 36, to which are pivoted links 37 and 38. The opposite ends of these links are pivoted to shifter arms 39 and 40, which in turn are pivoted to the cross member 4. The shifter arms are provided with the usual studs or pins to engage grooves formed in the sliding parts of the clutch couplings 28 and 29.

When the hand lever 33 is thrown to the upper broken line position of Fig. 2 the clutch 29 will be thrown into operative position, and when it is moved to the lower broken line position clutch 29 will be disengaged and the clutch 28 will function. As heretofore stated, when the hand lever 33 is in the central position, as indicated in the drawings, both clutches are disengaged.

Another vertical driving shaft 41 is journaled in a bearing 42 mounted on the cross member 4 and in other bearings in cross members 12 and 13. Means are provided for rotating this shaft in one direction or the other.

Secured to the lower end of shaft 41 is a bevel gear 43, which meshes pinions 44 and 45. The pinions 44 and 45 are fast to or made integral with female members 160 and 161 of cone clutches freely mounted on the shaft 22. The male members 162 and 163 of the cone clutches are splined to the shaft 22 and are provided with the usual grooves, which cooperate with pins on shifter arms 164 and 165. The shifter arms are pivoted to an extension from one of the side frame members 10, and their opposite ends are pivoted to links 166 and 167, which in turn are pivoted to short levers 168 and 169. The levers 168 and 169 are mounted on a pivot pin 170, to which the hand lever 171 is secured.

The hand lever 171 may be placed in three positions. As illustrated in Fig. 2, in the full line position, both cone clutches are disengaged and the shaft 41 will be stationary. When the hand lever is moved to the dotted line position at the right, the cone clutch 161, 163 will be engaged and shaft 41 will be driven in one direction. When the hand lever 171 is moved toward the left from the neutral position, cone clutch 161, 163 will be disengaged and clutch 160, 162 will function to drive the shaft 41 in the opposite direction.

The upper end of the shaft 41 at the region of the cross member 13 carries a bevel pinion 172, which engages a bevel gear 173 mounted on a shaft 174. The shaft 174 also has secured to it a worm wheel 175, which meshes a horizontal worm gear section 47, which lies above the cross member 13 toward the top of the fixed frame 9.

The sector 47 is secured to a deep and broad tubular journal 48, which extends downward through spaced bearings 49 and 50 in the cross members 13 and 12, forming a deep bearing for this depending journal.

The bottom member 51 of an open rectangular frame 52 is screwed at 53 to the outer part of the sector 47, and is also preferably welded or otherwise united to the upper end of the tube 48, and in this frame there is set a grease-tight mechanism casing 54, which is secured in the said frame by bolt rods and nuts 55. The top of the frame 52 carries a short tubular journal 56 in line with the journal 48, the journal 56 turning in a bearing 57 on the under side of a plate 153, which is secured to the top cross member 14 of the fixed frame of the derrick.

Figure 4:
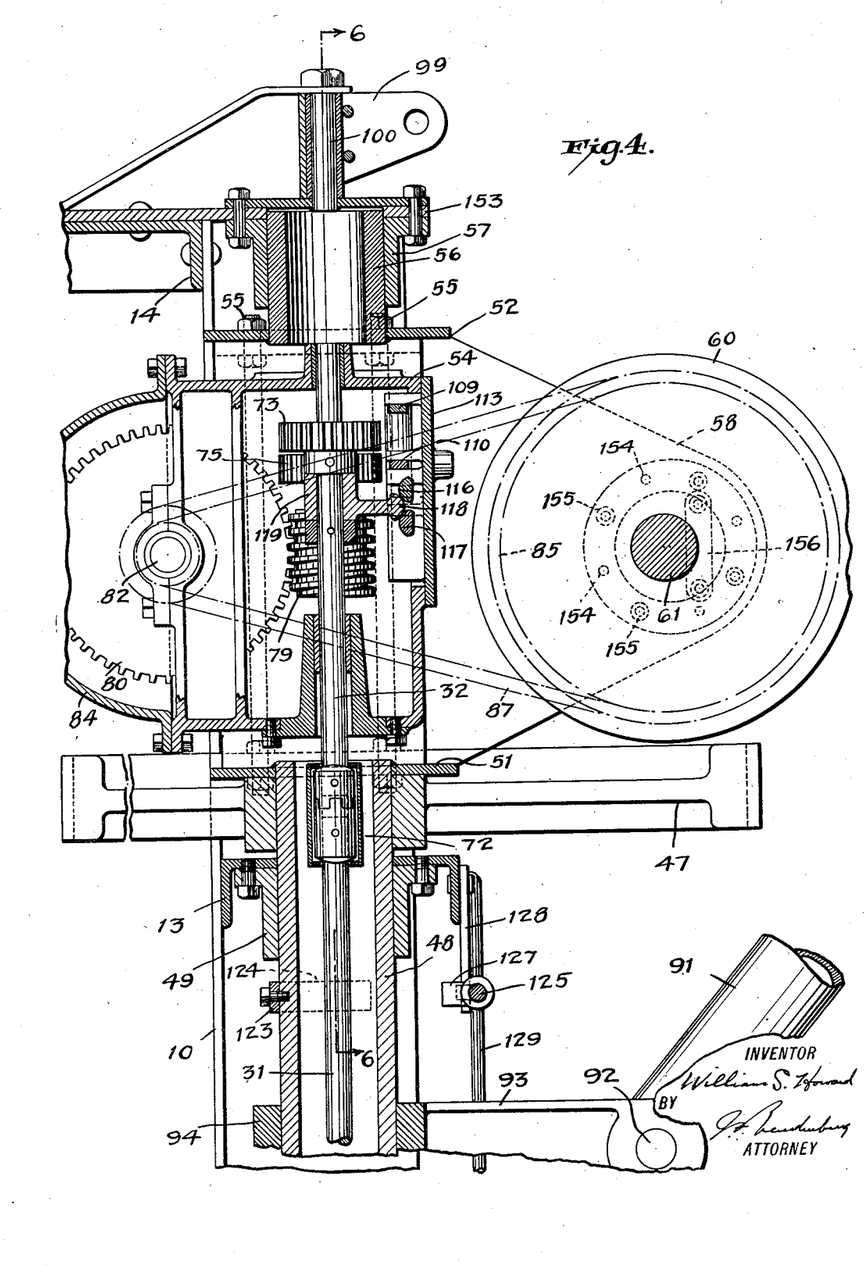
Fig. 4 is a section on the same line, showing approximately the upper half.

The side members of the frame 52 have forward extensions 58, which carry a pair of cable drums 59 and 60, these drums being independently rotatable upon a common horizontal axle 61, the ends of which are mounted in eccentric bearings 62 turnable in openings in the extensions of said frame side members. Sets of bolt or screw holes 154, indicated in Fig. 4, in the flanges of the bearings and in the extensions 58, in connection with screws 155, enable the bearings to be turned to successive indexed positions. Keys 156 screwed at their opposite ends to the flanges of the eccentric bearings, and their intermediate portions entering chordal slots in the end portions of the shaft 61, compel the two eccentric bearings to be adjusted alike.

The fore section 30 of the central vertical line shaft is splined in the sleeve 27, which is secured to the shaft 26 of the bevel gear 25. The section 30 has secured to its upper end a toothed block 63 of small transverse dimension. A complementary toothed block 64 is secured to the lower end of the middle shaft section 31, the teeth being loosely interfitting, and the two toothed members are retained in a loose or flexible driving engagement with each other by a narrow sleeve 65 having end rings or lips 66 which engage over and under the rounded shoulders of the two blocks. This construction affords an inexpensive, universally flexible driving joint between the shaft sections to compensate for any misalinement and for slight permissible flexing or weaving of the frame 9, which will necessarily occur in the use of the derrick, this frame being in its nature a somewhat flexible or yielding, though exceedingly strong, structure, which is much more suitable for the flexible vehicle frame on which it is mounted than a solid or perfectly rigid structure would be.

The sleeve 65 has a circumferential groove 68 to cooperate with a fork 69 of a rock-shaft 70. The fork 69 may be oscillated through suitable linkage 71 connected to a hand lever 70ª. The shaft 30, 31 and 32 can thus be raised and lowered. The shaft section 31 passes upward through the interior of the tubular journal 48, and at its upper end is flexibly connected to the upper shaft section 32 by a flexible joint 72 similar to the one which has just been described. The raising and lowering of the shaft sections 30 and 31 therefore raises and lowers the shaft section 32, which latter is journaled in bearings in the top and bottom of the overhead mechanism case 54. An advantage of the style of flexible joint which has been described will be apparent from Fig. 4, where it will be seen that the narrow dimension of the joints enables them to be passed through the tubular journal 48 in the operation of assembling, or to stand within this tube, which would not be possible with ordinary forms of universal driving connections.

The vertical movement of the central shaft is for the purpose of raising and lowering a pinion 73, which is fixed on the shaft section 32 within the case 54. This pinion in the neutral position illustrated is out of mesh with both of two companion gears 74 and 75, which are fixed to vertical shafts 76 and 77 journaled in bearings in the case 54. Raising of the pinion 73 will therefore cause it to engage with the gear 74, while lowering the pinion will cause it to engage with the pinion 75. The shafts 76 and 77 bear worms 78 and 79, respectively, these worms meshing with respective worm wheels 80 and 81, which are also within the case 54. The worm wheels 80 and 81 are fixed to separate horizontal shafts 82 and 83, journaled in bearings in the main body of the case inside a removable front cover 84. The ends of the shafts 82 and 83 pass outward through the side walls of the case and bear external sprocket pinions 85 and 86. Sprocket chains 87 and 88 pass about the sprocket pinions 85 and 86, respectively, and about large sprocket wheels 89 and 90 secured to the outer ends of the drums 59 and 60, respectively. By turning the eccentric bearings 62, slack in the sprocket chains can be taken up.

An extensible and contractible boom 91, made of telescopic sections, is connected at its inner end with the swivel support at a point somewhat below the sector 47, but considerably above the base of the fixed frame 9. The lower inner end of the boom is thus supported at a point above the mid-height of the frame, at such elevation as to clear the cargo placed on the vehicle directly behind the frame.

The inner end of the boom is pivoted on a horizontal pin 92 to a bracket 93, which has a hub 94 fixed to the tubular journal 48 directly above the cross member 12, upon which this boom support rests. Through the tubular journal 48, the weight of overhead swiveled structure and mechanism, including the sector 47, the drums, and the drum driving mechanism carried by frame 52 and the case 54, is likewise supported at this point.

The cable 157 from the drum 59 passes about a pulley 95 connected by a link 96 to the outer end of the boom and about a pulley 97 which is connected by a link 98 with a clip 99, which is supported on a pin 100 at the top of the frame 9, this pin being preferably secured to the plate 153 previously referred to. Operation of the drum 59 will therefore raise and lower the boom.

The drum 60 is the hoisting drum proper, and its cable 102 passes outward over a pulley 103 on the outer end of the boom, thence downward and about the pulley of a fall 104, and terminates in a hook 105 adapted to engage a clip 106 on the boom end. Operation of the drum 60 will therefore raise and lower the load relatively to the boom.

I have ascertained that worms such as 78 and 79, though of ordinary self-holding or irreversible pitch adapted to sustain the boom and the load thereon at any height, may nevertheless develop a tendency to coast under certain conditions, and in order to prevent this reverse action I have provided means for automatically locking and unlocking the respective drum mechanisms when they are disconnected and connected, respectively, with the driving means. This automatic locking means may be widely varied, but is most advantageously housed within the case 54 to cooperate with the worm shafts 76 and 77. In the particular construction illustrated a pair of dogs 107 and 108 are arranged to move into and out of locking engagement with the teeth of the gears 74 and 75. These dogs are on the ends of arms 109 and 110, which are carried, respectively, by vertical rock-shafts 111 and 112 mounted in bearings on the inside of a removable rear cover plate 113 of the case 54. These rock-shafts also carry, respectively, arms 114 and 115 which extend inward into vertically offset proximity to each other and terminate in rounded noses 116, 117, which are adapted to be acted upon by a rounded projection 118 carried by the vertical drive shaft section 32. The hub 119 of this projection is confined on the shaft 32, so as to be compelled to move vertically with said shaft when the driving gear 73 is raised or lowered, but is free from the shaft with respect to rotation and is held against rotation by guides on the plate 113, so that by these guides the projection 118 is confined in operative relation to the noses 116 and 117. In the neutral position shown in the drawings the projection 118 does not displace either of the arms 114, 115 bearing the noses 116 and 117, and the dogs 107, 108 are therefore both held in engagement with the gears 74 and 75 by springs 121, 122, respectively. When the gear 73 is moved upward to mesh with the gear 74, the projection 118 cams the nose 116 toward the wall 113, and this withdraws the dog 107 from the gear 75, releasing this gear so that it and its worm 79, and consequently the worm wheel 80 and the drum connected therewith by the sprocket 87, may be driven. The dog 108, however, remains in engagement with the gear 75, so that the drum 60 is locked. The projection 118 is moved downward from mid-position, the nose 117 is acted upon, and the dog 108 is released from the wheel 75, so that the drum 60 can be driven.

Means are also provided for automatically disconnecting the power from the swiveled support for the drum mechanism and boom when the boom reaches the permissible limits of its swinging movement in opposite directions, in order that the parts may not become strained or damaged by the boom striking against the sides of the frame and preventing further movement. This means may also be widely varied, but in the preferred construction a fitting 123 is fixed to the journal 48, this fitting having two wings 124 spaced an angular distance corresponding to the permissible extent of swinging of the boom.

A horizontal slide rod 125, guided in a suitable guide 126 on the frame, bears a projection 127, which when the boom is in the central vertical fore and aft plane is midway between the wings 124. The rod 125 is connected to a bell-crank 128, which in turn is connected to a rod 129, which extends downward and is connected to an arm 130 on the rock-shaft 170 of the lever 171. Consequently when the lever 171 is set to position the clutches 160—162, 161—163 for driving in either direction, one of the wings 124 will contact with the projection 127 when the boom reaches the permissible limit of its movement in that direction, and will automatically shift the rods 125 and 129 to throw the rock-shaft 170, the lever 171 and the clutches 160—162, 161—163 in one direction or the other, as the case may be, to neutral position thus disconnecting the power.

The worm 175 and worm gear sector 47 are self locking in relation to each other, thus providing means for locking the swiveled support for the drum mechanism and boom when the support is not being turned, in order that the boom shall be held against undesired swinging resulting from the vehicle standing on a side slope or resulting from the vehicle frame being tilted on its springs when the boom carrying the load is not in the fore and aft plane.

Due to the fact that the shaft 22 revolves at a comparatively rapid rate of speed and the swiveled support for the drum mechanism and boom moves slowly, it is desirable that a power-multiplying means be interposed between said shaft and the swiveled support for the drum mechanism. The bevel pinions 44 and 45 engaging the bevel gear 43 act as one step in the speed reduction or power multiplying means, the bevel pinion 172 on the upper end of shaft 41 engaging bevel gear 173 further reduces the speed and multiplies the power, and the worm 175 engaging the segment 47 acts as the final step in the power multiplying means.

The shaft 22 carries a skew gear 134, which meshes another skew gear 135 mounted on a vertical shaft 136 supported in suitable bearings. The vertical shaft 136 has a worm gear 137 secured to its upper end and meshing with a worm wheel 138 mounted on a shaft 139 which is journaled in bearings in one of the upright side frame members 10. This shaft 139 projects outward through the upright 10 and bears a nigger-head 140.

The toothed periphery of the large gear sector 47 extends from one side around rearwardly to a point just short of the plane or vertical space in which the boom is raised and lowered, and preferably extends a similar distance around to the front (using the terms front and rear in relation to the vehicle), and the worm 175 is at one side of the interior of the upright derrick frame. The sector is terminated at the rear in this manner in order that the boom may be raised upward within the gear circle without interfering with the gear. Manifestly a substantially complete gear might be used, with only a slot or notch cut out of it to accommodate the boom when thus raised, but as the boom is required to swing horizontally somewhat less than 180°, a sector of corresponding or slightly greater extent is sufficient.

In the operation of the device the hand lever 70ª is manipulated and set so as to raise or lower the driving gear 73, depending upon whether it is desired to raise or lower the boom or raise or lower the load in relation to the boom. The hand lever 33 is then moved up or down so as to cause either one of the clutches 28 or 29 to function. While the load is being raised or lowered or the boom is being raised or lowered, the hand lever 171 may be moved from its neutral position so as to engage either one of the cone clutches 160— 162 or 161—163, so as to swing the boom in the desired direction. It will therefore be apparent that the load may be raised or lowered simultaneously with the swinging of the boom, thus making for a simple and rapid means of operating the device and providing a live boom in which great selectivity of its various operating positions is readily obtainable.

While the preferred embodiment of the invention has been described in detail, it will be understood that there may be numerous changes in form, proportions, arrangement and details and by way of omission, addition or substitution without departing from essentials.

I claim:

1. The combination with an automobile truck, of a fixed structural frame mounted on the forward part of the chassis of the truck, said fixed frame being broad transversely of the chassis and very narrow from the base upward in the fore and aft direction, a boom swingingly mounted in said frame at an elevation to clear cargo placed on the chassis directly behind the frame, an overhead swiveled support mounted in the upper part of the frame above the boom, a hoisting drum carried by said swiveled support, and means for operating said drum and said swivel support.

2. The combination with an automobile truck, of a fixed structural frame mounted on the forward part of the chassis of the truck, said fixed frame being broad transversely of the chassis and very narrow from the base upward in the fore and aft direction, a boom swingingly mounted in said frame at an elevation to clear cargo placed on the chassis directly behind the frame, an overhead swiveled support mounted in the upper part of the frame above the boom, two drums carried by said swivel support, one being a hoisting drum and the other a boom raising and lowering drum, and means for operating said drums and said swiveled support from a source of power.

3. The combination with an automobile truck, of a fixed structural frame mounted on the forward part of the chassis of the truck, said fixed frame being broad transversely of the chassis and very narrow from the base upward in the fore and aft direction, a boom swingingly mounted in said frame at an elevation to clear cargo placed on the chassis directly behind the frame, an overhead swiveled support mounted in the upper part of the frame above the boom, a tubular journal extending downward from said swiveled support in a deep bearing in the frame, the boom being connected to said journal, and drum mechanism mounted on said swiveled support.

4. The combination with an automobile truck, of a fixed structural frame mounted on the forward part of the chassis of the truck, said fixed frame being broad transversely of the chassis and very narrow from the base upward in the fore and aft direction, a boom swingingly mounted in said frame at an elevation to clear cargo placed on the chassis directly behind the frame, an overhead swiveled support mounted in the upper part of the frame above the boom, a tubular journal extending downward from said swiveled support in a deep bearing in the frame, the boom being connected to said journal, drum mechanism mounted on said swiveled support, and means for driving said drum mechanism passing upward through said tubular journal.

5. The combination with an automobile truck, of a fixed structural frame mounted on the forward part of the chassis of the truck, said fixed frame being broad transversely of the chassis and very narrow from the base upward in the fore and aft direction, a boom swingingly mounted in said frame at an elevation to clear cargo placed on the chassis directly behind the frame, an overhead swiveled support mounted in the upper part of the frame above the boom, cable drum mechanism mounted on said swiveled support, means at the base of the frame for receiving power from the power plant of the truck, two transmission branches extending from said means upward in the frame to operate said drum mechanism and said swiveled support respectively, and means for controlling said branches.

6. The combination with an automobile truck, of a fixed structural frame mounted on the forward part of the chassis of the truck, said fixed frame being broad transversely of the chassis and very narrow from the base upward in the fore and aft direction, a boom swingingly mounted in said frame at an elevation to clear cargo placed on the chassis directly behind the frame, an overhead swiveled support mounted in the upper part of the frame above the boom, cable drum mechanism mounted on said swiveled support, means at the base of the frame for receiving power from the power plant of the truck, two transmission branches extending from said means upward in the frame to operate said drum mechanism and said swiveled support respectively, power control clutches and reversing mechanism interposed between said means and said branches in common to both branches, and separate means for controlling the respective branches.

7. The combination with an automobile truck, of a fixed structural frame mounted on the forward part of the chassis of the truck, said fixed frame being broad transversely of the chassis and very narrow from the base upward in the fore and aft direction, a boom swingingly mounted in said frame at an elevation to clear cargo placed on the chassis directly behind the frame, an overhead swiveled support mounted in the upper part of the frame above the boom, cable drum mechanism mounted on said swiveled support, a central vertical shaft in the frame for driving said drum mechanism, a horizontal shaft extending transversely in the frame from said central shaft, a shaft extending upward to operate said swiveled support, and power multiplying means interposed between said horizontal shaft and said swiveled support.

8. The combination with an automobile truck, of a fixed structural frame mounted on the forward part of the chassis of the truck, said fixed frame being broad transversely of the chassis and very narrow from the base upward in the fore and aft direction, a boom swingingly mounted in said frame at an elevation to clear cargo placed on the chassis directly behind the frame, an overhead swiveled support mounted in the upper part of the frame above the boom, cable drum mechanism mounted on said swiveled support, a horizontal shaft extending transversely at the lower part of the frame, power-controlling and direction reversing clutches mounted on said shaft, a central shaft extending upward in the frame from said horizontal shaft to drive said drum mechanism, a vertical shaft extending upward to operate said swiveled support, clutches on said horizontal shaft for controlling the direction of rotation of said vertical shaft, and power multiplying means interposed between said horizontal shaft and said swiveled support.

9. In an automobile truck derrick, a fixed upright frame broad transversely of the chassis and narrow from front to back, a large horizontal gear member mounted in the upper part of said frame, cable drum mechanism mounted with said gear member, and a boom connected with said gear member at a point beneath the same and at a considerable elevation above the base.

10. In an automobile truck derrick, a fixed upright frame broad transversely of the chassis and narrow from front to back, comprising a basal cross member mounted on the forward part of the chassis, side frame members erected on said cross member, and additional members connecting said side frame members, a large gear sector mounted in the upper part of said frame, a drum mechanism frame mounted with said sector, cable drum mechanism carried by said drum mechanism frame, a tubular journal extending downward from said frame in spaced bearings in said fixed upright frame, a boom connected with said journal between said bearings, and a top journal on said drum mechanism frame journaled in the top of the frame.

11. In an automobile truck derrick, a fixed upright frame broad transversely of the chassis and narrow from front to back, a large horizontal gear member mounted in the upper part of said frame, a drum mechanism frame mounted with said gear member, a cable drum mounted on said frame, an enclosed box set in said drum mechanism frame, a central shaft passing upward into said box, and gearing in said box for operating said drum from said shaft.

12. In a derrick, a frame, a swiveled support on the frame, a central vertical drive shaft, a gear on said shaft, two companion gears at different heights on vertical axes to be meshed by the central gear, means for moving said central gear vertically to mesh selectively with said companion gears, two worms connected with said companion gears, two worm wheels on horizontal axes meshed by said worms, two cable drums on said swiveled support, and connections between said worm wheels and said drums.

13. In a derrick, a frame, a swiveled support on the frame, a central vertical drive shaft, a gear on said shaft, two companion gears at different heights on vertical axes to be meshed by the central gear, means for moving said central gear vertically to mesh selectively with said companion gears, two worms connected with said companion gears, two worm wheels on horizontal axes meshed by said worms, two sprocket pinions connected with said worm wheels, two cable drums on said swiveled support, two sprocket wheels connected with said drums, and sprocket chains passing about said sprocket pinions and sprocket wheels.

14. In a derrick, a frame, a swiveled support on the frame, a central vertical drive shaft, a gear on said shaft, two companion gears at different heights on vertical axes to be meshed by the central gear, means for moving said central gear vertically to mesh selectively with said companion gears, two worms connected with said companion gears, two worm wheels on horizontal axes meshed by said worms, two sprocket pinions connected with said worm wheels, two cable drums on said swiveled support, two sprocket wheels connected with said drums, sprocket chains passing about said sprocket pinions and sprocket wheels, a common axle on which said drums are independently rotatable, and eccentric bearings on the swiveled support for the opposite ends of said axle.

15. In a derrick, a frame, a swiveled support on the frame, a central vertical drive shaft, a gear on said shaft, two companion gears at different heights on vertical axes to be meshed by the central gear, means for moving said central gear vertically to mesh selectively with said companion gears, locks associated with said companion gears, means whereby said locks are automatically controlled in relation to the shifting of said central gear, two worms connected with said companion gears, two worm wheels on horizontal axes meshed by said worms, two cable drums on said swiveled support, and connections between said worm wheels and said drums.

16. In a derrick, an upright frame, a swiveled support on the upper part of said frame, cable drum mechanism carried by said support, a boom connected with said support, a vertically shiftable drive shaft passing upwardly within said support, a gear on said shaft for driving said cable drum mechanism, and means connected with a lower part of said shaft for moving the same vertically to shift said gear into and out of driving relation to said mechanism.

17. In a derrick, an upright frame, a swiveled support on the upper part of said frame, cable drum mechanism on said support, a tubular journal extending downward from said support, a central shaft passing upward through said tubular journal to drive said mechanism, said shaft comprising sections, toothed blocks on the adjoining ends of said sections affording a flexible driving connection, and a retaining sleeve about said blocks having ends engaging over and under the shoulders thereof.

WILLIAM S. HOWARD.